United States Patent [19]

Beck et al.

[11] 4,269,455
[45] May 26, 1981

[54] ANTISKID BRAKE CONTROL SYSTEM

[75] Inventors: Arnold A. Beck, Clinton; Edgar J. Ruof, Akron, both of Ohio

[73] Assignee: Goodyear Aerospace Corporation, Akron, Ohio

[21] Appl. No.: 933,349

[22] Filed: Aug. 14, 1978

[51] Int. Cl.³ .............................................. B60T 8/08
[52] U.S. Cl. .................................. 303/106; 244/111; 303/109; 303/110
[58] Field of Search .................. 244/111; 303/93, 105, 303/106, 110, 91, 107, 109, 111; 361/238, 239, 240; 364/426

[56] References Cited

U.S. PATENT DOCUMENTS

| | | | |
|---|---|---|---|
| 3,584,921 | 6/1971 | Crawford | 303/110 |
| 3,768,873 | 10/1973 | Hirzel | 303/109 |
| 3,880,475 | 4/1975 | Booher | 303/106 |
| 3,980,349 | 9/1976 | Cook | 303/110 |
| 4,068,903 | 1/1978 | Straub | 244/111 |
| 4,130,323 | 12/1978 | Rajput | 303/106 |
| 4,193,642 | 3/1980 | Miller | 303/97 |

Primary Examiner—Harry E. Moose, Jr.
Assistant Examiner—Reinhard J. Eisenzopf
Attorney, Agent, or Firm—P. E. Milliken; E. W. Oldham; R. L. Weber

[57] ABSTRACT

An antiskid brake control system for a wheeled vehicle having a second order lead network in parallel connection with a deceleration detector. The deceleration detector includes both a current threshold level and a voltage threshold level, the deceleration rate of a wheel having to exceed both thresholds to result in a brake control signal to the modulator and brake control valves. The lead network, deceleration detector, and a modulator all feed a summing circuit which includes a switching circuit providing the system with two distinct characteristic gains. Also included is a circuit for linearly discharging certain capacitors in the system. Also included are locked wheel, touchdown protection, and low speed drop-out circuitry to regulate the application and release of antiskid control and touchdown and upon the occurrence of preselected vehicle activities.

22 Claims, 5 Drawing Figures

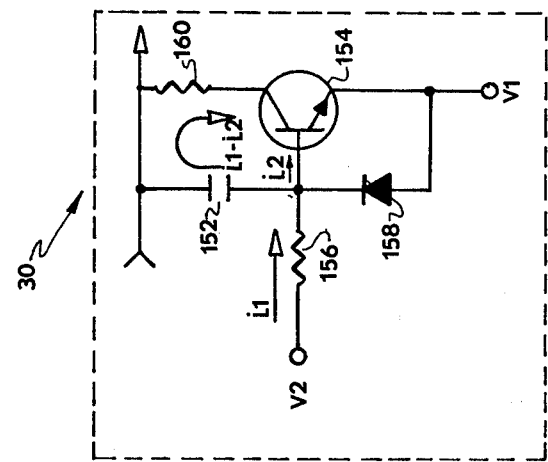
FIG. 4
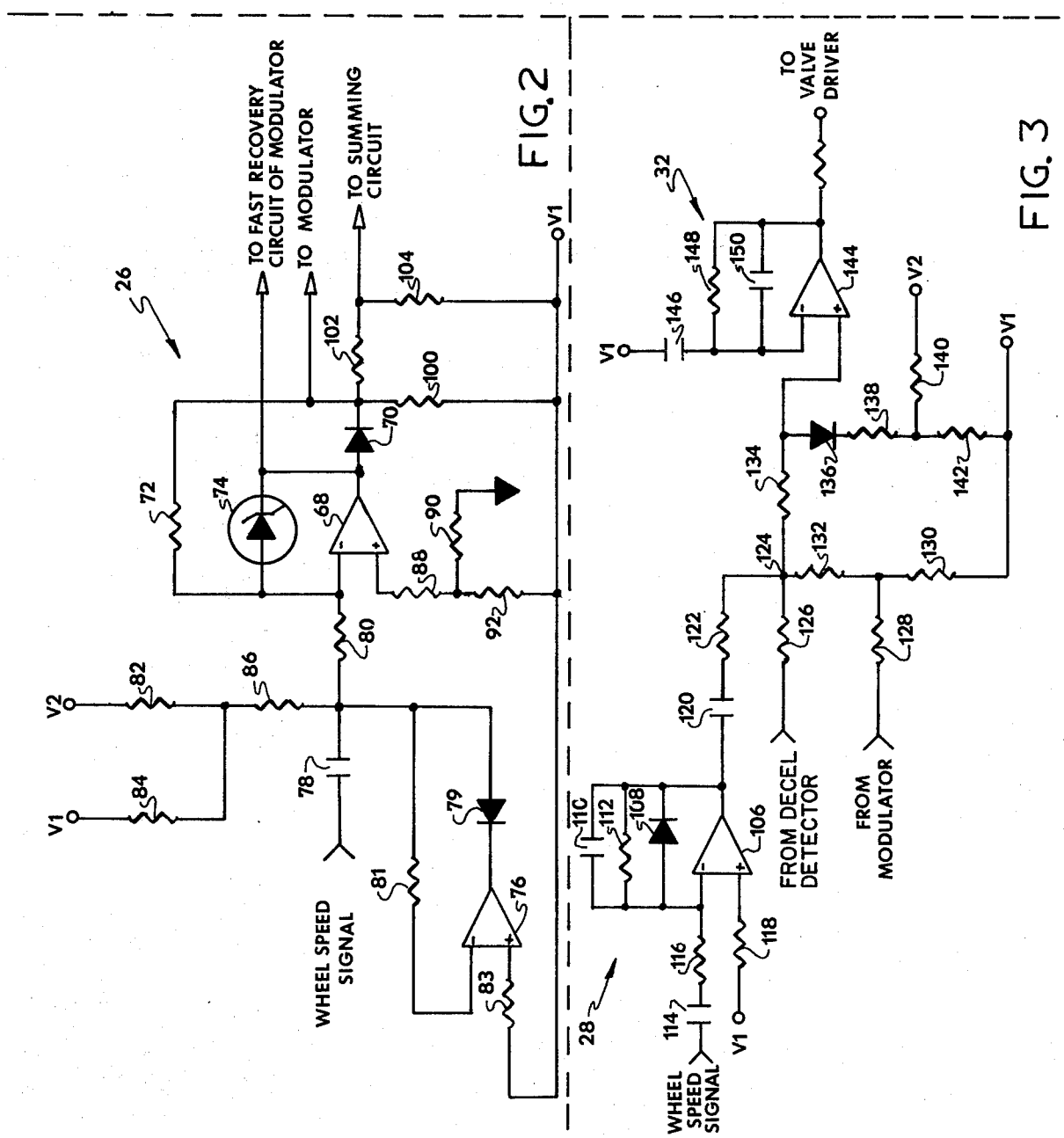
FIG. 2
FIG. 3

4,269,455

ANTISKID BRAKE CONTROL SYSTEM

BACKGROUND OF THE INVENTION

The invention disclosed herein resides in the art of antiskid control circuitry for operation of the braking systems of wheeled vehicles. More particularly, the invention comprises a system and related circuitry for implementation between wheel speed transducers associated with the wheels of an aircraft, and the valve or valves for braking the wheels in such a manner as to optimize the braking effort. The invention discussed hereinafter is presented with respect to aircraft having two independently braked wheels, but it is to be understood that such need not be the case and the techniques and circuitry described are equally applicable to aircraft or other vehicles having any number of braked wheels and which may be controlled in pairs or otherwise in concert with each other.

The art has taught a vast number of antiskid systems. Such systems have, however, generally included a lead network in series connection with a deceleration detector, resulting in less than optimum anticipation of skidding activity. Further, such systems have generally not included a variable system gain to guarantee that operation of the modulator of the antiskid system will remain effective regardless of the traction available. Yet further, prior art systems have generally been weak in noise immunity and have had limited ability to effectively dampen strut oscillations. Still further, while there are means to provide linear discharging of the modulator capacitor, such discharge circuitry has been relatively complex. Additionally, known systems have normally been incapable of providing locked wheel protection to override antiskid circuits when the rotational speed of a wheel drops below a predetermined percentage of the aircraft speed, while also providing means for delaying operation of the antiskid circuit for a predetermined time period or until the wheels have spun-up to a preselected speed. Yet further, such systems have generally not included means for inhibiting the application of brake pressure for an additional period of time if the wheels have not spun-up to a particular speed within a fixed period of time.

OBJECTS OF THE INVENTION

In light of the foregoing, it is an object of the instant invention to provide an antiskid brake control system for aircraft which provides a lead network in parallel connection with the deceleration detector to achieve rapid response to incipient skids.

Still another object of the invention is to provide an antiskid brake control system which includes variable system gain, guaranteeing effective operation of the modulator for all runway or road surface conditions.

A further object of the invention is to provide an antiskid brake control system which includes means for effectively discriminating signals from noise with minimal loss of response time and which further includes means for damping structural vibration modes of the braked vehicle.

Another object of the invention is to provide a stable deceleration threshold which is not affected by the wheel acceleration following a skid.

Yet another object of the invention is to provide an antiskid brake control system wherein the modulator capacitor is linearly discharged, providing for consistent and predictable operation of the modulator in reapplying brake pressure.

An additional object of the invention is to provide an antiskid brake control system wherein operation of the antiskid system is negated for a particular time period after touchdown or until a wheel has spun-up to a predetermined speed.

Still another object of the invention is to present an antiskid brake control system which includes means for inhibiting the application of brake pressure for yet an additional period of time if the wheels of the aircraft have not spun-up to a predetermined speed within a fixed time duration following touchdown.

Still another object of the invention is to provide an antiskid brake control system which is highly reliable in operation while achieving all of the foregoing objects in a cost-effective manner.

SUMMARY OF THE INVENTION

The foregoing and other objects of the invention which will become apparent as the detailed description proceeds are achieved by an antiskid system for assisting in controlling the application and release of brake pressure applied to the wheel of a vehicle, comprising: first means operatively connected to the wheel for producing an output signal indicative of the instantaneous rotational speed of the wheel; second means connected to and receiving said output signal from said first means for producing a deceleration signal corresponding to the instantaneous rate of deceleration of the wheel; and a lead network in parallel connection with said second means between said first means and a summing circuit.

DESCRIPTION OF THE DRAWINGS

For a complete understanding of the objects, techniques, and structure of the invention, reference should be had to the following detailed description and accompanying drawings wherein:

FIG. 2 is a schematic diagram of the deceleration detector and amplifier of the invention;

FIG. 3 is a schematic diagram of the lead network and summing circuit of the invention;

FIG. 4 is a schematic diagram of the linear discharge circuit used in association with the modulator capacitor of the invention.

DETAILED DESCRIPTION OF PREFERRED EMBODIMENT

Figure 1:
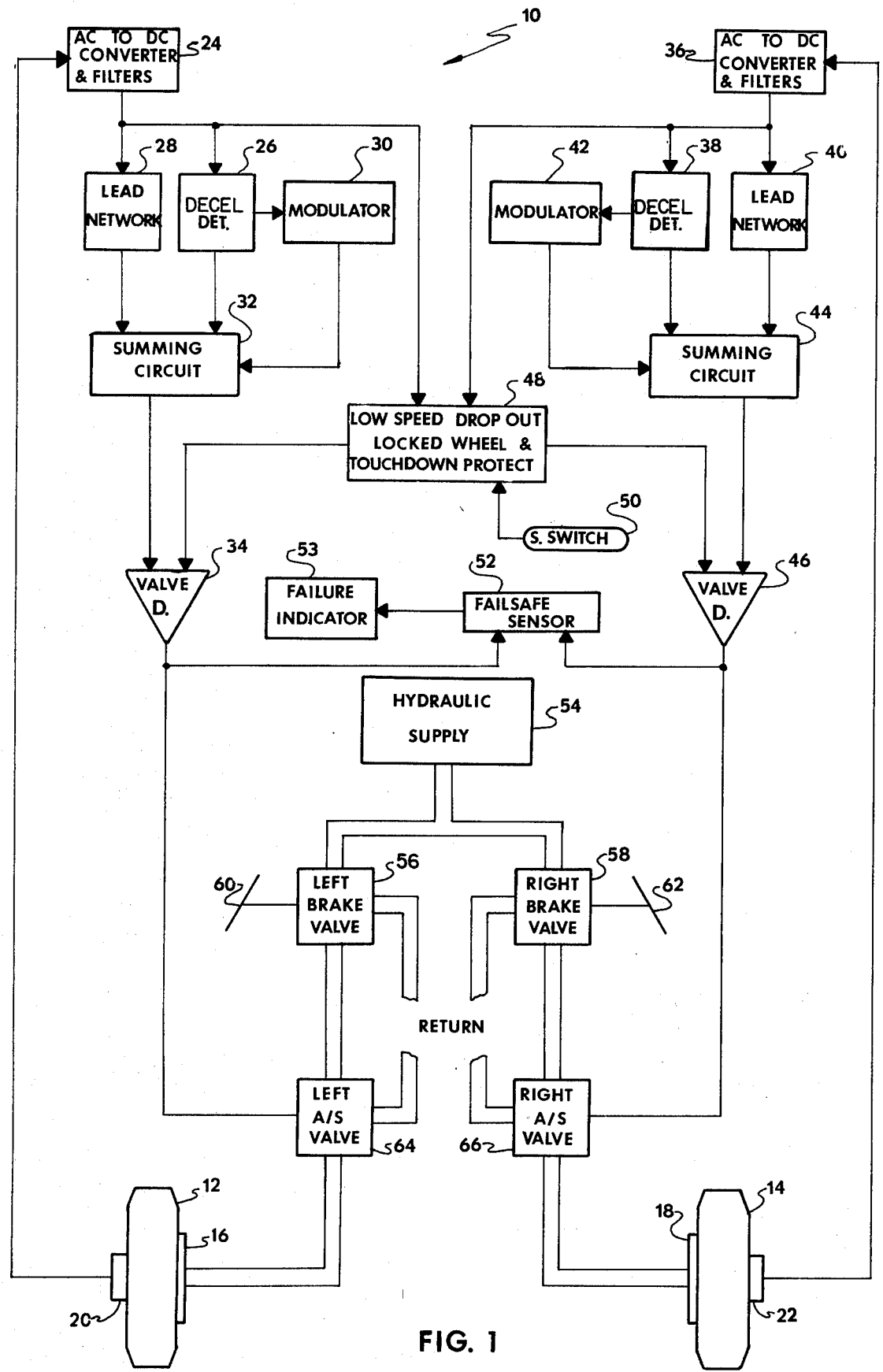
FIG. 1 is a functional block diagram of the brake control system of the invention.

Referring now to the drawings, and more particularly FIG. 1, it can be seen that a dual wheel braking system according to the teachings of the invention is designated generally by the numeral 10. Here, a left wheel 12 and right wheel 14, having respectively associated hydraulic brakes 16,18, are independently controlled by uniquely associated antiskid circuitry. To facilitate such control, each of the wheels 12,14 are respectively supplied with wheel speed transducers 20,22 which produce AC output signals of a frequency corresponding to the rotational speed of the associated wheel.

The output of the transducer 20 is supplied, in standard fashion, to an AC to DC converter and appropriate filters as designated by the circuit 24. The output of this circuit is a varying DC signal having an amplitude proportional to the instantaneous rotational speed of the wheel 12. This output is supplied, in parallel, to a deceleration detector 26 and a lead network 28. As will be discussed in detail hereinafter, the output of the deceleration detector 26 is a signal indicative of the instantaneous deceleration rate of the associated wheel 12. The lead network 28, again to be discussed hereinafter, is a second order lead network presenting an output signal which anticipates skids by measuring the rate of change of wheel deceleration and allows the antiskid system to respond more rapidly to the skids. It will be noted that by connecting the lead network 28 in parallel with the deceleration detector 26, rather than in series therewith, more rapid response of the system 10 is possible than heretofore achieved in the art.

An output of the deceleration detector 26 is applied to a modulator 30, which, but for a modification respecting the discharging of the modulator capacitor, functions in a somewhat standard manner. This modification will be discussed in detail herein. The outputs of the deceleration detector 26, lead network 28, and modulator 30, are applied to a summing circuit 32 which, as its name implies, sums the various output signals into a control signal for application to the associated antiskid valve driver 34. Of course, the summing circuit 32 also includes means for scaling the output of the circuits 26–30, to proportionately weight the amplitude of the outputs thereof. Again, the specific operation of the summing circuit 32 will be presented hereinafter.

It will be appreciated that the elements 24–34, discussed directly above, are associated with and operate to control the left wheel 12 via the associated hydraulic brake 16. Controlling the right wheel 14 by means of the hydraulic brake 18 is an identical set of circuit elements 36–46. Inasmuch as these latter mentioned circuit elements operate in a fashion substantially identical to the corresponding elements 24–34, detailed discussion of the same will not be made.

Also receiving outputs from the left and right converters 24,36 is the circuit 48. This circuit functions to achieve low speed drop-out of the antiskid system for taxiing purposes, low speed drop-out of the locked wheel protection circuit, and touchdown protection for the antiskid system to guarantee that the wheels 12,14 be free-rolling upon touchdown and for a predetermined time period thereafter. Outputs of the circuit 48 are supplied to the left and right antiskid valve drivers 34,46 to achieve the control to be discussed hereinafter. A failsafe protection circuit 52, somewhat standard in the art, is provided to produce a warning signal via the failure indicator 53 should certain failures occur as indicated by the outputs of the valve drivers 34,46.

Of course, the antiskid system 10 includes an hydraulic system including an hydraulic supply 54 connected to left and right metering brake valves 56,58, under control of respective brake pedals 60,62. In standard fashion, associated antiskid valves 64,66 are provided in series connection with the brake valves 56,58 and under control of the antiskid valve drivers 34,46. Thus, the left and right brake valves 56,58 control application and release of brake pressure to the associated brakes 16,18 as regulated by the antiskid circuitry controlling the antiskid valves 64,66.

DECELERATION DETECTOR 26

With reference now to FIG. 2, the detailed circuitry of the deceleration detector 26 may be seen. At the heart of the detector 26 is an amplifier 68 having at the output thereof a diode 70. This diode clamps the output of the amplifier 68 to the level V1 when the amplifier is driven negative. A feedback resistor 72, encompassing the diode 70, is provided in normal fashion to establish the gain of the amplifier 68. With the feedback resistor 72 encompassing the diode 70, this diode has no effect on the establishment of the gain of the amplifier circuit. Also provided in parallel connection between the negative input and output of the amplifier 68 is the zener diode 74 which clamps the positive output of the amplifier 68 at the characteristic zener level. The diodes 70,74 operate in concert to present only positive output signals, of set maximum value, to the modulator 30. These signals are passed not only to the modulator proper, but also to the fast recovery circuit thereof. While the details of the fast recovery circuit are not presented in detail herein, it will be understood to those skilled in the art that the same senses the output from the deceleration detector to determine if the runway coefficient has increased sufficiently to allow rapid increase of brake pressure toward the skid level. Such a circuit senses if no incipient skids have been encountered for a short, predetermined time period, indicating such an increase in runway coefficient and, if such is the case, the modulator voltage is reduced to provide for a corresponding increase in brake pressure.

An amplifier 76 is interconnected as a clamp at the junction between the deceleration capacitor 78 and input resistor 80. This clamp, also including diode 79 and resistors 81,83, establishes V1 as the maximum voltage which the junction may achieve. Also connected to this junction is a voltage divider comprising resistors 82–86 which provides a reference deceleration current to the junction. This threshold current is drained off by the deceleration capacitor 78 when the associated wheel 12 decelerates, as evidenced by a corresponding change in the wheel speed signal from the associated converter 24. When the deceleration of the wheel has increased to a point where the current supplied by the voltage divider 82–86 is totally drained, then the voltage at the junction between the deceleration capacitor 78 and input resistor 80 begins to drop below V1. It will be noted that until this point, there has been no time delay associated with this reference level inasmuch as the voltage at the junction between the capacitor 78 and resistor 80 has remained constantly at V1.

Connected to the positive input of the amplifier 68 is a voltage divider comprising resistors 88–92, being set to establish the positive input just below the level of V1. When the wheel speed signal drops sufficiently to draw the negative input of the amplifier 68 below the threshold established by the divider 88–92, the amplifier 68 produces a positive output signal indicating that the rate of deceleration of the associated wheel has exceeded the predetermined deceleration threshold level.

It will be appreciated by those skilled in the art, as mentioned above, that the first threshold level, established by the voltage divider 82–86, does not have a time constant associated therewith. This provides for rapid response of the deceleration detector 26 to changes in the wheel speed signal. However, once all of the current supplied by the voltage divider 82–86 has been drained by the deceleration capacitor 78 and a voltage change begins to occur at the negative input of the amplifier 68, a time delay is experienced. This time delay, however, is tolerable in that the capacitor 78 and resistor 80 function as a filter at this point in time to provide noise immunity for the amplifier 68.

The output of the amplifier 68 is provided not only to the modulator 30, but is also provided to the summing circuit 32. The output resistor 100 provides a low impedence output for the amplifier 68, while the resistors 102,104 are selected to operate as a voltage divider for scaling the output of the amplifier 68 prior to application to the summing circuit 32. It can thus be seen that, in the absence of an incipient skid, the output of the amplifier 68 actuates the fast recovery circuit of the modulator to lower the modulator voltage and increase brake pressure, while the occurrence of such a skid will be applied to the summing circuit 32 and modulator 30 for purposes presented hereinafter.

LEAD NETWORK 28 AND SUMMING CIRCUIT 32

A particular point of novelty of the instant invention is parallel connection of the lead network 28 with the deceleration detector 26. The noise immunity provided for by the filter 78,80 as discussed above, is compensated by this parallel connection without affecting the modulator. Quick anticipation of oncoming skids is achieved by the system 10 by means of the lead network 28 which, as shown in FIG. 3, is a second order circuit.

The first order of the lead network comprises the amplifier 106 being clamped by the diode 108 such that only positive outputs are evidenced therefrom. The capacitor 110 and resistor 112 are provided in the feedback circuit to operate as a noise filter. Similarly, the capacitor 114 and resistor 116 are provided at the negative input of the amplifier 106 to again operate as a noise filter. In combination, the capacitor 114 and resistor 112 operate as a differentiator to take the first derivative of the incoming wheel speed signal provided from the associated converter 24,36. This differentiated wheel speed signal then comprises a deceleration signal evidenced at the ouput of the amplifier 106. Of course, in standard fashion, the positive input of the amplifier is connected through an input resistor 118 to the appropriate voltage source V1.

The second stage of the lead network 28 comprises the capacitor 120 and resistor 122 which again operate as a differentiator. In this second stage, the second derivative of wheel speed is achieved for the purpose of determining the rate of change in wheel deceleration. This second stage also adjusts the phase of the signal to be applied to the summing circuit 32 such that this signal may adjust brake pressure in a manner to dampen strut vibration. In other words, circuit values of the elements 120,122 are selected such that signals emitted from the output of the second stage of the lead network 28 will be in the proper phase to dampen strut oscillations.

The output of the lead network 28 is applied to the summing point 124 of the summing circuit 32. This summing point also receives an output from the deceleration detector 26 via the input resistor 126. Finally, the output from the modulator 30 is applied to the summing point 124 through the scaling resistors 128-132. The voltage then applied to the associated valve driver 34,46 is a composite of appropriately scaled signals from the lead network 28, deceleration detector 26, and modulator 30.

Receiving the signal from the summing point 124 is an amplifier 144. The signal is received through an input resistor 134. However, interposed between the amplifier 144 and resistor 134 is a diode 136, which, when the input signals to the amplifier are low, is nonconductive. However, for high voltage level input signals, the diode 136 conducts and effectively lowers the gain of the amplifier 144. Consequently, the system gain is also lowered when the signal from the summing point 124 exceeds a predetermined threshold level. This threshold level is established by the elements 136-142, with the resistors 140,142 establishing a voltage divider between the levels V1 and V2. By appropriately selecting circuit values, the level may be established at which system gain is altered or reduced. Most commonly, it is desired to establish this level such that a low runway coefficient of friction will not result in signals to the valve driver of such amplitude as to cause the system 10 to operate in an on/off mode of operation, negating the operation of the modulator 30. In other words, by reducing system gain when the control signals from the summing point 124 exceed a threshold level, it is assured that braking of the aircraft is maintained under control of the modulator 30 even when runway coefficient has been greatly reduced.

Also included as a portion of the summing circuit 32 is a lead-lag circuit comprising the capacitor 146 interconnected between the voltage source VI and the feedback circuit comprising resistor 148 and capacitor 150. This type of lead-lag circuit is well known in the art and the component values thereof are selected to produce optimum performance.

It will be seen that the output of the circuitry of FIG. 3 is applied to the associated valve driver 34,46, to regulate the corresponding antiskid valve 64,66 for regulation of brake application. Control of the valve driver is achieved not only through the modulator 30 and deceleration detector 26, but also through a second order lead network 28 and a lead-lag circuit 146-150. Yet further, the system 10 is provided with a variable gain to compensate for low runway coefficients.

MODULATOR 30

The specific structure of the modulator of the system 10 is not deemed to be critically important to the aspects of the instant invention. Indeed, virtually all known antiskid systems incorporate a modulator to function as a memory circuit for keeping the average brake pressure near the aircraft skid level, and to regulate reapplication of brake pressure following release of the same. The modulator of the instant invention is typical in this regard and, consequently, not discussed in detail herein. However, the modulator 30 does include unique means for providing a constant current discharge of the modulator capacitor to guarantee uniform operation of the modulator in performing the foregoing functions.

With reference now to FIG. 4, it can be seen that the modulator 30 includes a modulator capacitor 152, charged in standard fashion by output signals from the deceleration detector indicating that the rate of deceleration has exceeded the above-mentioned threshold levels. One side of the modulator capacitor 152 is connected to the base of the transistor 154, with that base also being connected to the voltage V2 through the resistor 156. The emitter of the transistor 154 is connected to the lower voltage source V1, while the collector is connected through the resistor 160 to the capacitor 152. In operation, a constant current i1 is supplied from the voltage source V2 through the resistor 156. A small portion of the current i1 is applied as base current to the transistor 154, and is designated as i2. The current through the capacitor 152, resistor 160, and collector-emitter of transistor 154, is then equal to i1−i2. If the transistor 154 is selected to have a high gain, for example, 100 or more, i2 becomes insignificant and the discharge current of the capacitor 152 becomes, for all intents and purposes, equal to i1. Since i1 is a constant current, the current through the capacitor 152 is also constant and, upon discharge, the voltage change across the capacitor must therefor be linear. Consequently, a true linear discharge of the modulator capacitor is achieved. Such a linear discharge provides uniform operation of the modulator and guarantees smoother and more uniform reapplication of brake pressure upon release. It will be noted that the resistor 160 is selected to limit the discharge of capacitor 152 when an increase in voltage is applied thereto. Similarly, the diode 158 is included to provide a current path for the capacitor 152 when the fast discharge circuit is activated.

LOW SPEED DROP-OUT, LOCKED WHEEL, AND TOUCHDOWN PROTECTION CIRCUIT 48

Figure 5:
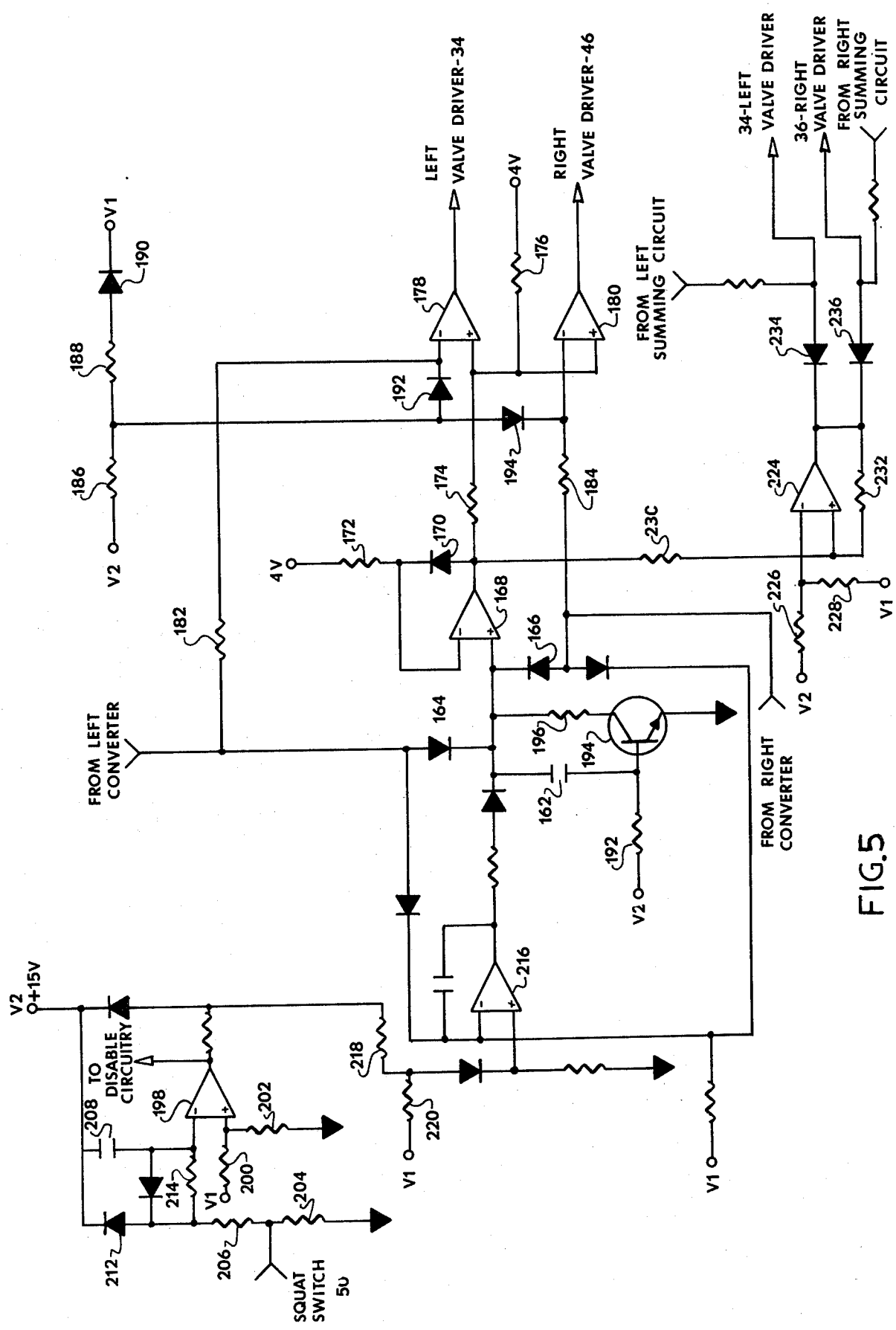
FIG. 5 is a schematic diagram of the low speed dropout, locked wheel, and touchdown protection circuitry of the invention.

The locked wheel circuit of the instant invention operates to dump brake pressure by overriding the normal antiskid circuit operation whenever a wheel degenerates to a speed of less than thirty percent of the aircraft speed. In the circuitry of FIG. 5, capacitor 162 acts as a memory and reservoir of the aircraft speed. Diodes 164,166 respectively pass signals from the left and right converters 24,36 to charge the capacitor 162. The greater of these two speeds is controlling and, hence, is used as the aircraft speed. The positive input of the operational amplifier 168 is connected to the capacitor 162 and the voltage thereof is one diode drop below the controlling converter voltage. However, the diode drop is regained at the output of amplifier 168 by virtue of the current passing through diode 170 and resistor 172. Hence, the output voltage of the amplifier 168 closely represents aircraft speed.

The resistors 174,176 form a voltage divider between V1 and the output of the amplifier 168. The values of these resistors are selected such that the positive inputs of amplifiers 178,180 each receive, for example, thirty percent of the output voltage of the amplifier 168. In other words, the positive inputs of these amplifiers receive a varying reference signal corresponding to thirty percent of the aircraft speed. The negative inputs of the amplifiers 178,180 are supplied respectively from the left converter 24 and right converter 36, through associated resistors 182,184. It will be understood that, in normal operation, the outputs of the amplifiers 178,180 would be low, in that actual wheel speeds would be in excess of thirty percent of the aircraft speed. However, if the wheel speed of either wheel drops below thirty percent of the aircraft speed, then the output of the associated amplifier 178,180 will turn on and send a full dump signal to the associated valve driver 34,46.

There is provided a predetermined cut-off speed for operation of the locked wheel detector. This circuit comprises the locked wheel arming circuit as the same is functionally known in the art. In the instant invention, a 30-knot signal is selected, but, of course, it will be understood that any suitable cut-off speed could be selected. This reference voltage is developed through the voltage divider comprising resistors 186,188 and diode 190 interconnected between the voltages V1 and V2. This cut-off speed reference voltage is applied to the negative inputs of amplifiers 178,180 via diodes 192,194 respectively. The reference level fixes the lower level of the negative inputs of the amplifiers 178,180 and overrides the outputs from the converters 24,36 when the aircraft speed drops below a predetermined level. For example, if a 30-knot cut-off speed is desired, and if the resistors 174,176 are selected to present thirty percent of the aircraft speed at the positive input of the amplifiers 178,180, then the voltage divider 186,188 is designed to present an overriding 9-knot signal at the negative inputs of the amplifiers 178,180. In this example, then, when the aircraft speed drops below 30 knots, the negative inputs of the amplifiers 178,180 will be greater than the positive inputs, thus inhibiting outputs therefrom.

The memory capacitor 162 operates in a manner similar to that of the capacitor 152 of the modulator 30, discussed above. The resistor 192 is connected to the voltage source V1 to supply constant current to the transistor 194. The transistor is interconnected with the capacitor 162 via the collector resistor 196, and the operation of the elements 192–196 to provide a constant current linear discharge of the capacitor 162 is substantially identical to that discussed before.

The circuit 48 also includes touchdown protection to guard against the brakes of the aircraft being actuated at the time of touchdown. In standard fashion, the transition of the aircraft from the air to the ground is sensed by a squat switch 50 which is operative to send a voltage signal to the touchdown protection circuit while the switch is in the "ground" position. The transition of the switch 50 usually occurs at the instant of touchdown, but the effect is preferably delayed for a predetermined period of time, e.g. 2.5 seconds, by the amplifier 198 and its related components. In the air, the amplifier 198 is turned on, having a high output, because the voltage divider 200,202 interconnected between V1 and ground, holds the positive input of the amplifier 198 at a higher voltage than the negative input which is at ground potential because of the squat switch 50 being open. At touchdown, the switch 50 closes, putting the aircraft line voltage V3 at the junction between resistors 204,206. Capacitor 208 then begins to charge through resistors 206,214. The diode 212 acts to stabilize the voltage at the junction between resistors 206,214 at a diode drop above V2, thus assuring a consistent charge rate for the capacitor 208 regardless of the actual voltage V3 of the aircraft supply. A fixed time period after closure of the switch 50, the voltage of the negative input of amplifier 198 reaches that of the positive input, and the output of the amplifier goes low. Thus, the effect of closure of the squat switch 50 is delayed 2.5 seconds, providing an extra margin of safety for wheel spin-up in the event of a slick runway. Of course, the time delay can be regulated by properly selecting the resistors 206,214, and the capacitor 208.

In the air, while amplifier 198 is turned on, the positive input of amplifier 216 receives a voltage from the voltage divider 218,220 through the diode 222. This voltage corresponds to a predetermined vehicle speed which keeps amplifier 216 turned on until either wheel exceeds such speed after touchdown. This spin-up override supercedes the 2.5 second delay provided by amplifier 198 whenever the wheels spin-up before the end of the 2.5 second delay; such generally being the case.

Amplifier 216 turns off either when a wheel goes above a predetermined level (for example, 36 knots), or when 2.5 seconds have passed after touchdown and closure of the squat switch, as determined by the amplifier 198 and associated circuitry. In either case, capacitor 162 begins to discharge when amplifier 216 turns off. Ordinarily, the wheels spin-up at touchdown and the voltage of capacitor 162 is thereafter maintained by the higher of the output voltages of the converters 24,36. In the unlikely event of failure of the wheels to spin-up at touchdown, the capacitor 162 would begin to discharge after the time delay established by the amplifier 198 and capacitor 208 and brake pressure would remain off for the period of time required for capacitor 162 to discharge. For example, the circuit comprising elements 162 and 192–196 can be selected such that an additional 5 second delay is imposed in such a situation. In any event, the output of the locked wheel detector is passed directly to the associated valve drivers 34,46 via the amplifiers 178,180.

Also included in the circuit 48 is a drop-out circuit which disables the normal antiskid circuit below a fixed threshold level. This circuit has no effect on the locked wheel circuits which are ineffective below a slightly higher threshold level. The negative input of the amplifier 224 is connected through a voltage divider 226,228 to the voltage supply V1,V2 to set a threshold level at the negative input thereof. Resistor 230 passes the aircraft speed signal from the amplifier 168 to the positive input of the amplifier 224 with the resistor 232 providing an hysteresis effect about the amplifier to prevent erratic operation of the same. With aircraft speeds above the threshold levels established by the divider 226,228, the output of the amplifier 224 is turned on, evidencing a high output. When the aircraft speed drops below this threshold level, the output of amplifier 224 goes low, gating the valve drivers 34,36 off through respective diodes 234,236. Thus, the antiskid circuit is disabled at the low threshold level, established at approximately 15 knots, to provide for taxiing of the aircraft.

In the foregoing, certain threshold values have been given and it is to be understood that such values are not limiting but may readily be altered to satisfy the parameters established for the aircraft using the instant invention. Voltages have been referenced and, again, such voltages may vary. However, in a preferred embodiment of the invention, the voltages were as follows:
V1=4 volts
V2=15 volts
V3=28 volts.

It will further be understood that the system has been presented with respect to dual control of a dual-wheeled aircraft, but that certain of the techniques and circuits of the invention are equally adaptable to paired-wheel control. Further, it will be understood that while discussions above have, at times, been with response to a single wheel, identical circuitry is utilized to control the other wheel of the dual-wheeled aircraft.

Thus, it can be seen that the objects of the invention have been satisfied by the structure and circuitry presented hereinabove. While in accordance with the patent statutes only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. An antiskid system for assisting in controlling the application and release of brake pressure applied to the wheel of a vehicle, comprising:

first means operatively connected to the wheel for producing an output signal indicative of the instantaneous rotational speed of the wheel;

second means connected to and receiving said output signal from said first means for producing a deceleration signal corresponding to the instantaneous rate of deceleration of the wheel; and a modulator interconnected between said second means and a summing circuit, said summing circuit summing signals from said modulator and second means, and producing an aggregate signal, said summing circuit including an amplifier receiving said aggregate signal, said amplifier having connected thereto means for reducing the gain of the antiskid system when said aggregate signal exceeds a predetermined threshold level.

2. The antiskid system according to claim 1 which further includes a second order lead network, receiving said output signal and applying to said summing circuit the second derivative of said output signal.

3. The antiskid system according to claim 2 wherein said lead network further includes dual noise filters.

4. The antiskid system according to claim 1 wherein said means for reducing gain comprises a diode interconnected between an output of said amplifier receiving said aggregate signal and a fixed voltage level.

5. The antiskid system according to claim 1 wherein said modulator includes a modulator capacitor connected across the base and collector of a transistor, the base of said transistor being connected to a constant current source and said transistor having a gain on the order of 100.

6. The antiskid system according to claim 1 wherein said second means comprises a capacitor interconnected between said first means and an amplifier and having a threshold current supply interconnected between a first input of said amplifier and said capacitor.

7. The antiskid system according to claim 6 wherein said second means further includes a threshold voltage supply connected to a second input of said amplifier.

8. The antiskid system according to claim 6 wherein said threshold current supply includes a voltage clamp, limiting the voltage which may be applied to said first input of said amplifier.

9. The antiskid system according to claim 1 which further includes third means connected to said first means for producing a signal corresponding to a predetermined percentage of the vehicle speed, and comparator means interconnected between said first means and said third means for producing an output signal when the rotational speed of the wheel drops below said predetermined percentage of the vehicle speed, the output of said comparator means being applied to a valve for releasing brake pressure.

10. The antiskid system according to claim 9 which further includes threshold voltage means connected to said comparator means for inhibiting outputs from said comparator means when the vehicle speed drops below a predetermined level.

11. The antiskid system according to claim 9 wherein said third means includes a memory capacitor connected to said first means, said memory capacitor being connected across a transistor, the base of said transistor being connected to a constant current source.

12. The antiskid system according to claim 1 which further includes a touchdown protection circuit interconnected between said first means, a squat switch, and a brake valve driver, said circuit including a time delay circuit actuated by said squat switch and producing an output signal enabling said valve driver a predetermined time after actuation of said squat switch.

13. The antiskid system according to claim 12 wherein said touchdown protection circuit further includes means interconnected between said first means and said time delay circuit for enabling said valve driver when the wheel has achieved a predetermined rotational speed.

14. In an antiskid system of the type having means for generating a wheel speed signal corresponding to the instantaneous rotational speed of a wheel, the improvement of a deceleration detector, comprising:
   an amplifier;
   a capacitor receiving the wheel speed signal and connected to an input of said amplifier; and
   a current source interconnected between said input of said amplifier and said capacitor, said current source including a voltage clamp limiting the voltage present at said input to a predetermined level and establishing a first deceleration threshold level.

15. The improvement in an antiskid system as recited in claim 14 wherein said current source further includes a voltage divider connected to said voltage clamp.

16. The improvement in an antiskid system as recited in claim 14 which further includes means for setting a fixed voltage level at another input of said amplifier, said voltage level establishing a second deceleration threshold level.

17. The improvement in an antiskid system as recited in claim 16 wherein said capacitor differentiates the wheel speed signal, creating a deceleration signal corresponding to the instantaneous rate of deceleration of the wheel, and wherein said amplifier produces an output signal when said deceleration signal exceeds both threshold levels.

18. The antiskid system according to claim 1 wherein said modulator comprises:
   a modulator capacitor;
   a transistor interconnected with said modulator capacitor across the base and collector thereof; and
   a current source connected to said base and said capacitor.

19. The improvement as recited in claim 18 which further includes a resistor interposed between said capacitor and said collector.

20. The improvement as recited in claim 18 wherein said transistor has a characteristic gain greater than 100.

21. The improvement as recited in claim 20 which further includes a diode connected to said capacitor and providing a current path for said capacitor independent of said current source.

22. An antiskid system for assisting in controlling the application and release of brake pressure applied to the wheel of a vehicle, comprising:
   first means operatively connected to the wheel for producing an output signal indicative of the instantaneous rotational speed of the wheel; and
   second means connected to and receiving said output signal from said first means for producing a deceleration signal corresponding to the instantaneous rate of deceleration of the wheel, comprising:
   a capacitor;
   an amplifier;
   a threshold current supply interconnected between a first input of said amplifier and said capacitor, including a voltage clamp limiting the voltage which may be applied to said first input; and
   a threshold voltage supply connected to a second input of said amplifier.

* * * * *